(12) United States Patent
Merritt (10) Patent No.: US 11,691,530 B2
(45) Date of Patent: Jul. 4, 2023

(54) MOBILE ELECTRIC VEHICLE CHARGING STATION EMPLOYING MULTIPLE POWER SOURCES

(71) Applicant: Thomas Duran Merritt, Hollywood, FL (US)

(72) Inventor: Thomas Duran Merritt, Hollywood, FL (US)

(73) Assignee: Pet Projects, Inc., Miami, FL (US)

( * ) Notice: Subject to any disclaimer, the term of this patent is extended or adjusted under 35 U.S.C. 154(b) by 160 days.

(21) Appl. No.: 16/873,701

(22) Filed: Jun. 5, 2020

(65) Prior Publication Data

US 2021/0380007 A1    Dec. 9, 2021

(51) Int. Cl.
| | |
|---|---|
| *B60L 53/00* | (2019.01) |
| *B60L 53/57* | (2019.01) |
| *B60L 53/52* | (2019.01) |
| *B60L 53/53* | (2019.01) |
| *B63J 3/04* | (2006.01) |
| *B60L 53/31* | (2019.01) |
| *B60L 53/51* | (2019.01) |

(52) U.S. Cl.
CPC ............... *B60L 53/57* (2019.02); *B60L 53/31* (2019.02); *B60L 53/51* (2019.02); *B60L 53/52* (2019.02); *B60L 53/53* (2019.02); *B63J 3/04* (2013.01); *B60G 2204/16* (2013.01); *B63J 2003/043* (2013.01)

(58) Field of Classification Search
CPC .......... B60L 53/57; B60L 53/31; B60L 53/51; B60L 53/52; B60L 53/53; B60G 2204/16; B60G 2300/60; B63J 2003/043; Y02T 10/7072; Y02T 90/12
See application file for complete search history.

(56) References Cited

U.S. PATENT DOCUMENTS

| | | | | | |
|---|---|---|---|---|---|
| 3,559,027 | A | * | 1/1971 | Arsem | H02K 21/14 322/3 |
| 3,696,251 | A | * | 10/1972 | Last | H02K 35/00 310/15 |
| 3,921,746 | A | * | 11/1975 | Lewus | B60G 13/14 180/165 |
| 4,032,829 | A | * | 6/1977 | Schenavar | B60K 25/10 322/3 |
| 4,218,624 | A | * | 8/1980 | Schiavone | B60L 15/20 322/4 |

(Continued)

FOREIGN PATENT DOCUMENTS

| | | | |
|---|---|---|---|
| CN | 1385596 | A * | 12/2002 |
| CN | 201592659 | U * | 9/2010 |

(Continued)

*Primary Examiner* — Naum Levin
(74) *Attorney, Agent, or Firm* — Laurence A. Greenberg; Werner H. Stemer; Ralph E. Locher (57) ABSTRACT

A mobile power station for the purpose of recharging electric vehicles is provided. The charging station includes separate, but different, types of electrical generation capabilities. For example, the charging station may include two or more of: wind power, solar power and power generated from suspension mounted oscillators, which charge its battery pack over land. If desired, the mobile power station can be amphibious, as well, with the ability to navigate small and large bodies of water.

7 Claims, 6 Drawing Sheets

(56) References Cited

U.S. PATENT DOCUMENTS

| | | | | |
|---|---|---|---|---|
| 4,500,827 | A * | 2/1985 | Merritt | H02K 35/02 |
| | | | | 322/3 |
| 6,952,060 | B2 * | 10/2005 | Goldner | B60G 17/0157 |
| | | | | 310/15 |
| 7,207,851 | B1 * | 4/2007 | Gibbs | B60F 3/0007 |
| | | | | 440/12.5 |
| 8,299,754 | B2 * | 10/2012 | Hayashigawa | B60L 53/16 |
| | | | | 320/109 |
| 9,496,750 | B2 * | 11/2016 | Hayashigawa | H02J 7/007 |
| 2010/0270871 | A1 * | 10/2010 | Chou | H02K 7/1853 |
| | | | | 310/15 |
| 2012/0303193 | A1 * | 11/2012 | Gresser | B60K 16/00 |
| | | | | 903/907 |
| 2013/0009469 | A1 * | 1/2013 | Gillett | H02J 3/381 |
| | | | | 307/25 |
| 2018/0069416 | A1 * | 3/2018 | Brace | F03D 9/00 |

FOREIGN PATENT DOCUMENTS

| | | | | |
|---|---|---|---|---|
| CN | 102865197 | A | * | 1/2013 |
| CN | 103847454 | A | * | 6/2014 |
| CN | 203739811 | U | * | 7/2014 |
| CN | 203938990 | U | * | 11/2014 |
| CN | 104608914 | A | * | 5/2015 |
| CN | 204846107 | U | * | 12/2015 |
| CN | 104015582 | B | * | 4/2016 |
| CN | 106223264 | A | * | 12/2016 |
| CN | 106976424 | A | * | 7/2017 |
| CN | 109795278 | A | * | 5/2019 |
| CN | 113370728 | A | * | 9/2021 |
| CN | 114524035 | A | * | 5/2022 |
| JP | 2011033166 | A | * | 2/2011 |
| JP | 2011105307 | A | * | 6/2011 |
| JP | 4756405 | B1 | * | 8/2011 ............ H02K 35/02 |
| JP | 5596847 | B1 | * | 9/2014 |
| KR | 20120135538 | A | * | 12/2012 |
| RU | 2654898 | C1 | * | 5/2018 |
| RU | 2658713 | C1 | * | 6/2018 |
| TW | M284604 | U | * | 1/2006 |
| TW | 201728496 | A | * | 8/2017 ............... B60K 6/48 |
| WO | WO-02091552 | A2 | * | 11/2002 ......... B60G 17/0157 |
| WO | WO-2015182945 | A2 | * | 12/2015 |

* cited by examiner

MOBILE ELECTRIC VEHICLE CHARGING STATION EMPLOYING MULTIPLE POWER SOURCES

CROSS-REFERENCE TO RELATED APPLICATIONS

The present application is a continuation in part of application Ser. No. 15/932,885 entitled Mobile Electric Vehicle Charging Station Employing Multiple Power Sources, filed on May 15, 2018 now abandoned. Additionally, this application claims benefit of co-pending Provisional Patent Application No. 62/507,440, filed on May 17, 2017, entitled Mobile Electric Vehicle Charging Station Employing Multiple Power Sources, that application being incorporated herein, by reference, in its entirety.

BACKGROUND OF THE INVENTION

Field of the Invention

The invention relates to a mobile electric vehicle charging station employing multiple power sources. In one particular embodiment, the charging station additionally has amphibious capabilities.

Description of the Related Art

In contemporary times, hybrid electric vehicles have become profuse around the world. These fuel saving designs have become popular because of their high mileage characteristics. However, certain vehicle manufacturers have moved to design and implement pure electric powered vehicles. These vehicles have eliminated the necessity for gasoline or diesel engines as part of the design. A drawback to this apparent progress, however, is the necessity of recharging these vehicles from time to time; thereby limiting the distance they are able to travel. The introduction of advanced battery chemistries resulting in lighter more powerful batteries has helped somewhat, has not provided a cure-all for this shortcoming. To alleviate this situation, fixed location electric vehicle charging stations are being constructed along many routes of our highway system. These stations derive their power from the grid or in the case of a prior art design, Brace et al (US 20180069416) which discloses such a charging station utilizing two or more power sources, including solar and wind derived energy.

When not traveling great distances, the users of electric vehicles can recharge them at their residences, using high cost electricity, which can equal or surpass the cost of the previously used fuels, such as gas, diesel, or natural gas. This fact can weigh on the decision of the consumer whether or not to purchase an all electric vehicle, to begin with.

What is needed is a mobile, electric vehicle power charging device that has the ability to operate off grid while also capable of recharging itself while operating stationary, as well as during the period of movement to a desired location

BRIEF SUMMARY OF THE INVENTION

It is accordingly an object of the invention to provide a mobile, electric vehicle power charging station that solves the disadvantages of the prior art. More particularly, a mobile, electric vehicle power charging device is provided that includes solar and wind power to achieve recharging, thus recharging itself during operation. In one particular embodiment, the highly mobile power charging station also utilizes gravity, through the use of linear electrical generators embedded within suspension components of the mobile device, therein generating power while moving along the surface of the earth, or in other cases, the surface of a moon or another planet.

Although the invention is illustrated and described herein as embodied in a mobile electric vehicle charging station employing multiple power sources, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
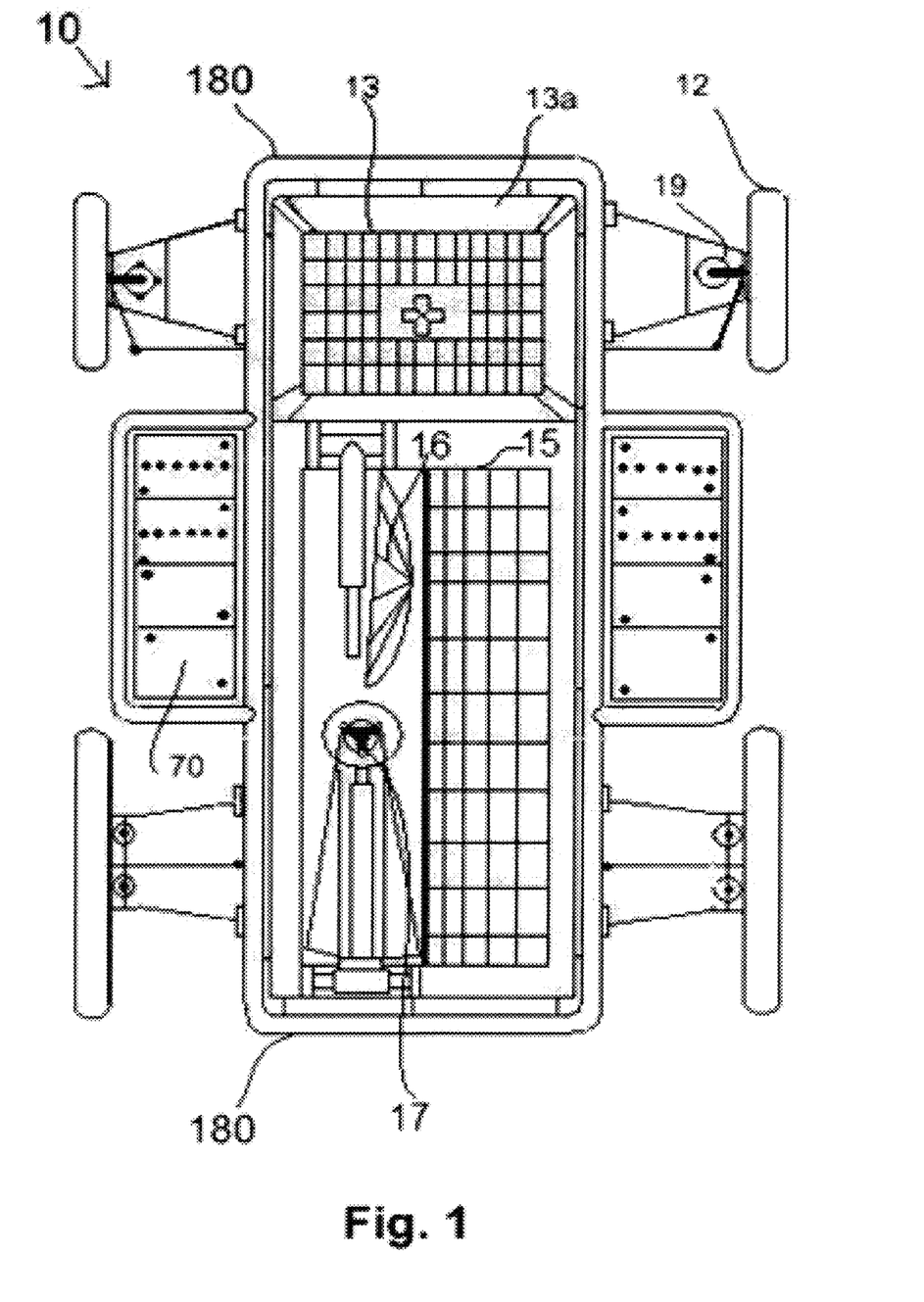
FIG. 1 is a top plan view of a mobile, electric vehicle charging station employing multiple power sources in accordance with one particular embodiment of the invention; illustrating as well the placement of electricity producing components including linear electrical generators.
Figure 2:
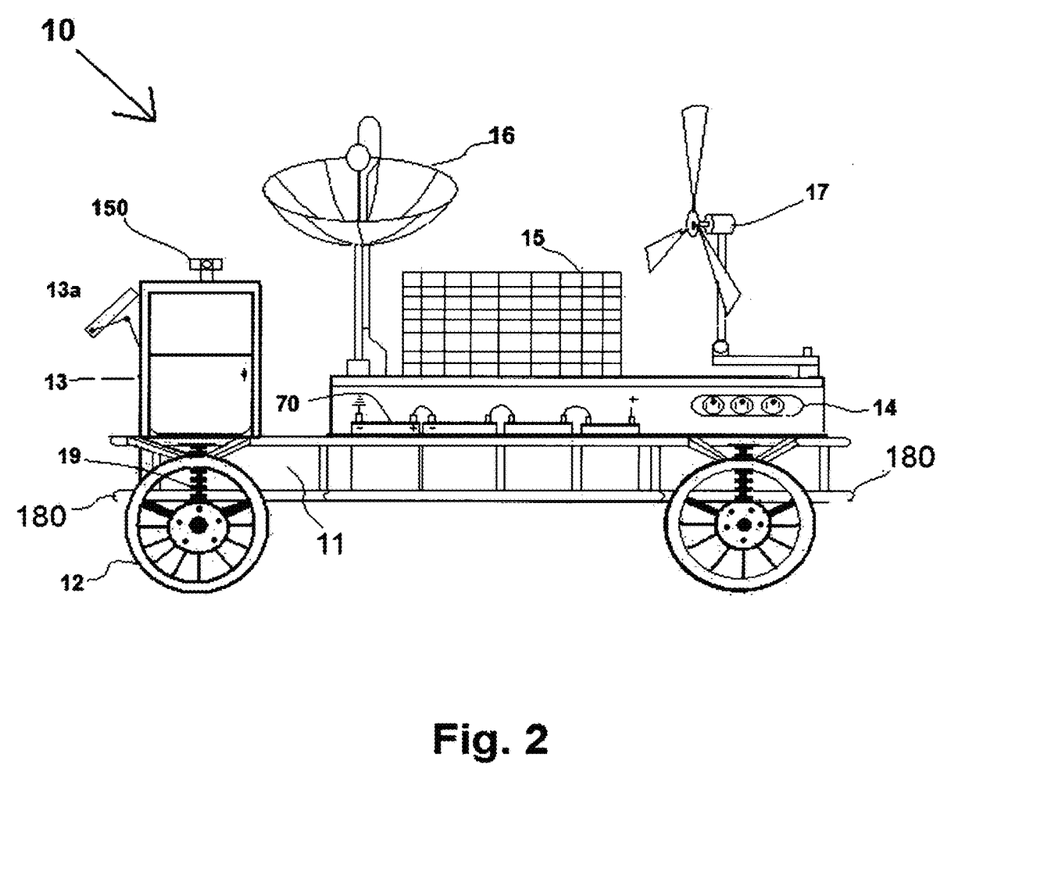
FIG. 2 is an elevation or a side view of a mobile, electric vehicle charging station employing multiple power sources in accordance with one particular embodiment of the invention
Figure 2A:
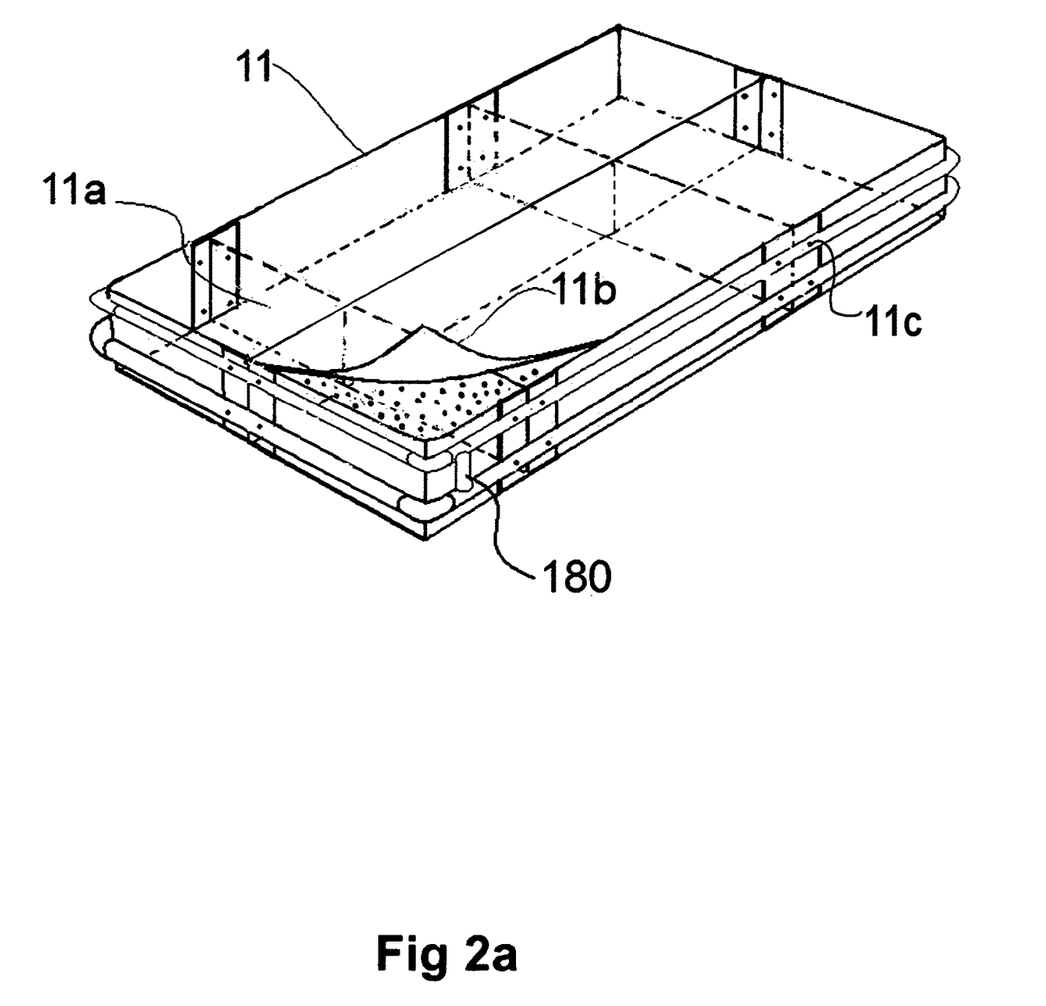
FIG. 2a is a perspective view of a high strength lightweight infrastructure cast within a form comprised of closed cell foam, covered with a hardened fabric such as carbon fiber, secured within a tubular support structure, thereby creating a basis for a buoyant chassis element for the purpose of supporting the electric vehicle charging station
Figure 3:
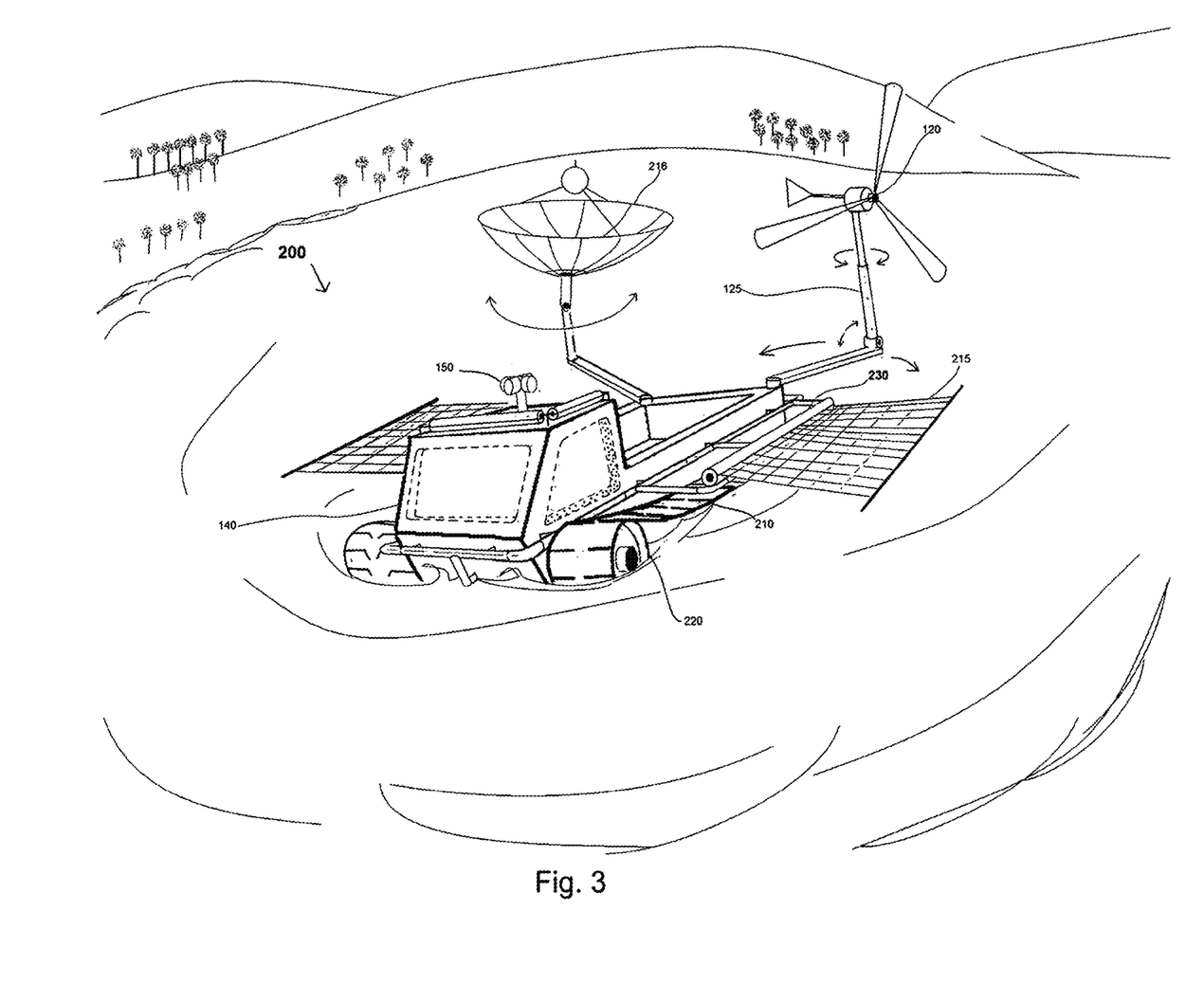
FIG. 3 is a perspective view of another embodiment of a mobile, electric vehicle charging station in water, illustrating off road and amphibious capability of the invention.

Referring now to FIGS. 1-3, there is illustrated more than one particular embodiment of a mobile, electric vehicle charging station 10 employing multiple power sources for its own recharging, during operation. More particularly, the charging station 10 includes a plurality of different, power sources. In one embodiment, the charging station 10 includes solar panels 110 and a wind turbine 120 for generating power from the wind. In all of its' embodiments, the charging station 10 additionally includes linear generators embedded within suspension components of the charging station 10 for the purpose of generating power while moving along the surface of the earth. Such linear generators can be, for example, the linear generators described in U.S. Pat. No. 4,500,827, issued on Feb. 19, 1985 to Thomas Merritt, et al or alternately, any suitable linear generator capable of being adapted for the desired purpose. Power generated is stored in a battery pack or packs in combination with supercapacitors onboard the charging station 10. The charging station, including a drive motor being electrically powered, can therefore travel immense distances without the necessity of having to be recharged from an external source.

The prior art of Brace et al (U.S. 2018/0069416) illustrates a charging station for electric vehicles, however, has no off road or amphibious capability, Brace et al also lacks power assistance from gravity. The herein described mobile electric charging station can possess amphibious capabilities, thereby providing the capability to navigate lakes to reach electric boats which require recharging. Specifically, the mobile charging station described herein, by way of its multiple charging mechanisms, has the ability to operate continuously with no external recharging connection, such as the electrical grid, as well as having the ability to recharge other separate electrical apparatuses requiring a charge, in any remote or urban location, thereby overcoming the disadvantages of the prior art and thus, fulfilling an emerging need.

Referring now to FIG. 2, the mobile, electric vehicle, charging station 10 includes a chassis 11, which is substantially supported by the wheels 12, of which there are four, in the present preferred embodiment. Wheels 12 can be selected to permit the mobile charging station to travel on road and/or off road, as desired. Additionally, the wheels 12 can be omitted, moved or removed for amphibious use of the charging station 10, i.e., to charge electric boats. The charging station 10 can additionally include an operator's compartment 13, from which the charging station 10 can be operated. Operator's compartment 13 can include windows or viewing ports 13a to permit the operator to see outside the compartment 13. In one particular embodiment of the invention, the operator's compartment 13 is mounted to the front portion of the charging station 10. Linear generators 19, shown mounted within suspension components derive power by means of reciprocal motion created when the apparatus moves. Additionally, although not illustrated, a steering mechanism is provided to enable an operator to steer the wheels 12 and to proceed in the forward and reverse directions.

In accordance with the present invention, two or more power sources are provided for charging the battery pack of the mobile charging station 10. In the embodiment illustrated in FIG. 1, three power sources are used. For example, the charging station 10 includes: 1) fold-out solar panel wings or sails 15, for solar charging; 2) a fold-down wind turbine 17, for wind power charging; and 3) solar thermal equipment 16 for charging. Note that this is not meant to be limiting, as other charging methods can be selected, so long as two or more charging methods are used.

Additionally, the charging station is provided with one or more electrical sockets 14 for connection to a vehicle to be charged or to an external charging source. For example, the sockets 14 permit the charging station 10 to be attached to another vehicle (not shown), via an electrical cable or conductor, to charge the other vehicle, or can be used to attach the charging station 10 to a power source, such as an off-grid or on-grid power supply at a user's dwelling.

In every particular embodiment of the invention, the mobile charging station 10 is a motorized vehicle, not a device that is passively carried or pulled as illustrated in the prior art of Brace et al mentioned above. Consequently, for Brace to become amphibious, it must somehow be transported to a dock, loaded by crane onto a ship, and then set up to operate shipboard. This, however, does not fit the true definition of the word amphibious.

Figure 4:
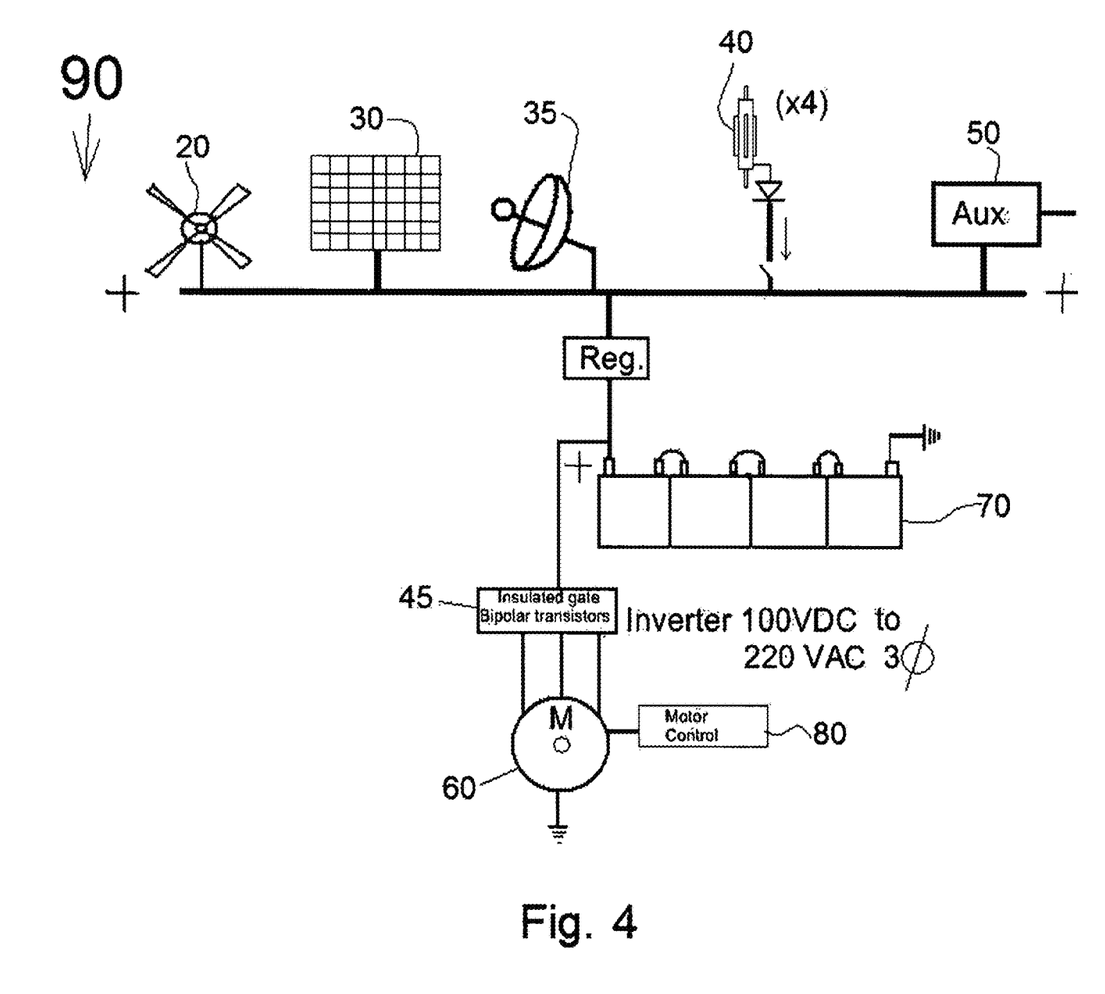
FIG. 4 is a generalized circuit diagram for a mobile, electric vehicle charging station in accordance with one particular embodiment of the invention.

Referring now to FIG. 4, a generalized circuit diagram 90 for a mobile, electric vehicle charging station including multiple, different power sources, such as 10 of FIGS. 1-3, will now be described. In the preferred embodiment illustrated, five different power sources are provided for recharging the charging station. A wind turbine 20 is provided that, when the rotor blades are turned by the wind, can generate electricity that is stored in the station 10. It is not uncommon for a wind turbine having as small a diameter as 4 feet to produce significant amounts of power with merely a 3 mph wind. If desired, more than one wind turbine 20 may be provided. Similarly, one or more solar panels 30 are provided that additionally generate electricity that can be stored in the station 10. One or more linear generators 40, as discussed above, are positioned on the spindles of the vehicle and use gravity to generate electricity which gets stored in the station 10. In one particular embodiment, four linear generators 40 are provided—one associated with each wheel 12 of the charging station 10. More can be fitted if desirable. Additionally, if desired, an auxiliary input/output 80 is provided that can be used as an input to charge the station 10 from an external power supply or as an output, for connection to a vehicle to be charged. A control, 80 such as a processor or computing element, is additionally provided to control the elements of station 10.

Each of the power sources 20, 30, 35, 40, 50 preferably provides more than 24 volts to the station 10. Electricity produced from the power sources 20, 30, 35, 40, 50 is regulated by a regulator and stored in the bank of batteries or battery pack 70. In one particular embodiment, the battery pack includes four batteries, storing a maximum of 100 DC volts which can be drawn upon for recharging another vehicle or for powering an electric drive motor 60 of the mobile, electric vehicle charging station 10, via an inverter 45. The drive motor 60 is used to move the charging station 10 to any location where it is required, or to any location one desires.

Referring now to FIG. 3, herein illustrated as a tracked, off road, amphibious vehicle, another embodiment of a mobile, electric vehicle charging station 200, in accordance with the present invention. Charging station 200 has the ability to deploy a very large array of flexible solar panels 215, by winding them compactly within a canister 230 for storage, and unwinding them for deployment, as illustrated. Additionally, the wind turbine assembly 120 can be folded and lowered into a storage compartment 130. In one particular embodiment, the wind turbine assembly 120 is located atop a telescoping shaft 125, and is rotatable 360° about the telescoping shaft 125.

The charging station 200 additionally includes an operator's compartment 140 in which an operator can sit while moving the charging station 200 to a desired location. In one particular embodiment of the invention, the enclosure forming the operator's compartment is made using closed cell urethane foam, high "R" value insulation, such as is shown in the FIG. 2a chassis illustration also covered by a hardened fabric, such as carbon fiber or Kevlar®. The material used for the enclosure of the operator's compartment is, in one particular embodiment, composed of closed cell urethane, or another, similar material (i.e., EPP foam, EPS foam, etc.). This also provides protection to the operator in hazardous areas of operation, while contributing to the buoyancy of the apparatus.

As, in the present embodiment, the viewing ports are completely obscured by the hardened fabric covering, 360° vision is provided through the use of closed-circuit TV (CCTV) cameras 150 mounted on the exterior of the operator's compartment 140. The CCTV cameras 150 are connected to monitors 160 on the interior of the operator's compartment 140. In one embodiment, four (front-facing, rear-facing, left-side and right-side facing) CCTV cameras 150 are provided, with corresponding monitors 160 being provided inside the operator's compartment 140.

As a result of the high R value of the construction material, closed cell foam, the operator's compartment 140 may be heated or cooled using a miniscule or negligible amount of energy, for the operator's comfort. As mentioned, the particularly described closed-cell foam composition of the operator's compartment will provide additional buoyancy for amphibious operation, as well.

Figure 5:
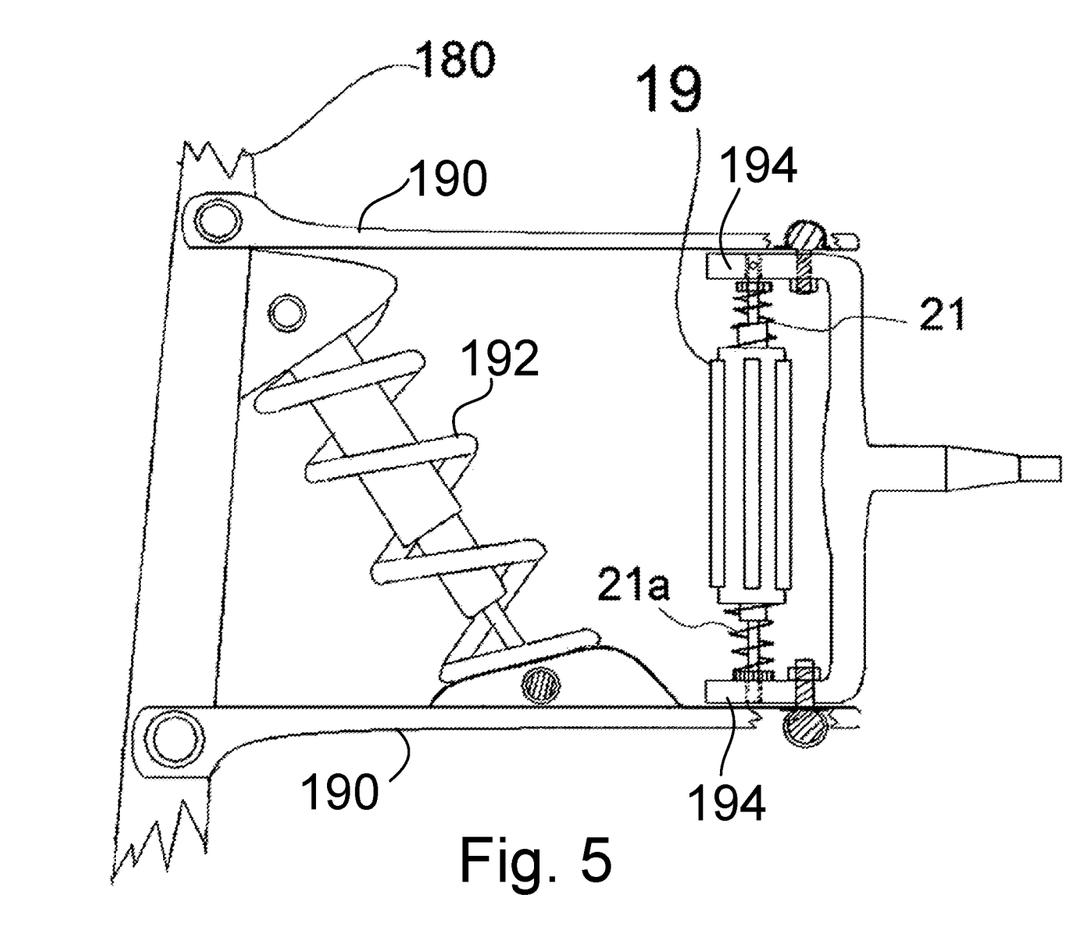
FIG. 5 illustrates a linear electrical generator disposed within vehicle suspension components of a mobile electric vehicle charging station with particular reference to the structure of the generator as well as a mounting location within the suspension components.

Being most desirable, the entire body of the charging station 100 can be constructed using structural foam as shown in FIG. 2a, covered with a hardened fabric 11b, such as carbon fiber, and surrounded by a tubular frame 180, to which the wheeled or track support units are attached. Referring now to FIG. 2A, there is shown a chassis element comprised of closed cell foam, within the confines of which is encased a high strength, lightweight, rigid, infrastructure or structural element 11a and including a hardened carbon fiber covering 11b. Structural element 11a serves as a fixation point for the tubular support structure or tubular frame 180, which serves as a mounting point for all necessary suspension components. The tubular frame 180 is fastened to the structural element 11a via fasteners 11c. Although not illustrated in FIG. 3, linear generators, as described above in connection with FIGS. 1, 2, and 5 can be provided. Similarly, a steering mechanism would be included for use by an operator. The linear generator is not intended to function during amphibious operation and is electrically disconnected in water. The linear generator mentioned herein is in practice a linear alternator developing alternating current, comprised of a simple armature of permanent or electro magnets, shaft mounted, within a stator comprised of windings and laminations, wherein both components are allowed to move in opposite directions simultaneously, thereby distinctive from a rotary alternator wherein the stator remains fixed. This simultaneous movement is enabled by the method of attachment of the device within the suspension components, as illustrated in FIG. 5, which suspension components include control arms 190, coil spring shock absorbers 192, axle bearing spindles 194, and mounted reciprocating electrical generators 19. Adjustment springs 21 and 21a are disposed at each end of the moving stator of the generator to prevent over travel of the opposite moving components and to multiply the effects of any vibration imposed upon the device by the effects of the movement upon any surface, whereupon a constant desirable oscillation is sustained.

Additionally, since power can be received from, and provided to, the charging station, electrical connections, sockets or outlets are placed at various locations on the charging station. Electrical connections 170 permit the charging station to be recharged from an external source, as well as providing power to other electric vehicles that need to be charged.

Referring again to FIG. 3, there is illustrated further embodiment of a mobile charging station 200 in accordance with the present invention. The mobile charging station 200 shown herein operating in water is provided with tracks or treads 210 driven by two or more wheels 220, instead of only the wheels (12 of FIG. 1) illustrated in the previous embodiments. This gives the station 200 the ability to traverse extremely rugged terrain, granting the mobile charging station 200 access to the most remote regions. A mobile charging station 200, which is, of course, electrically powered, would be useful for silently powering military command posts or for disaster relief, rescue operations, and/or providing access to snowbound areas, among other operations. All other elements of the station 200 can be as disclosed in connection with the station 10 of FIGS. 1 and 2.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

The invention claimed is:

1. A mobile electric vehicle charging station with amphibious capability configured for recharging electrically powered devices, comprising:
    a chassis element composed of a high strength, lightweight structural element cast within a form of closed cell foam, said chassis element completely enclosed within a hardened carbon fabric, thereby rendering it rigid and waterproof, thereby impervious to weather, said chassis element exhibiting buoyancy;
    an operators compartment, in communication with said chassis element;
    a high strength tubular structure totally surrounding and affixed to said chassis element, said tubular structure configured for the attachment of suspension components including control arms, coil spring shock absorbers, axle bearing spindles, and mounted reciprocating electrical generators, to configure said chassis as a steerable wheeled or tracked vehicle;
    at least one storage battery in combination with at least one supercapacitor; and
    an electric drive motor with controls for driving the mobile electric vehicle charging station.

2. The mobile electric vehicle charging station of claim 1, wherein said mounted reciprocating electrical generators configured for simultaneously moving both an armature and a stator in opposing directions, thereby multiplying the number of oscillations per unit of force exerted upon the generator.

3. The mobile electric vehicle charging station of claim 1, further providing support, deployment, and storage of wind powered electricity generators, as well as distinct types of solar electricity generating equipment.

4. The mobile electric vehicle charging station of claim 3, wherein a portion of said solar electricity generating equipment is photovoltaic material including flexible sheets of photovoltaic cells which can be wound and unwound on a rotatable spool or shaft, said rotatable spool or shaft of photovoltaic cells further configured to be stored within a tubular canister mounted upon the charging station, when not providing power.

5. The mobile electric vehicle of claim 1, further comprising a support structure completely surrounding a periphery of the chassis element, and suspension components attached to the support structure, said suspension components including at least one control arm, spindle, coil spring, shock absorber, or linear reciprocating alternator configured to produce electricity at said chassis element.

6. The mobile electric vehicle of claim 1, further comprising:
    at least one storage battery in combination with at least one supercapacitor; and an electric drive motor with controls, configured for driving the mobile electric vehicle charging station.

7. The mobile electric vehicle of claim 5, wherein the suspension components include at least one linear reciprocating alternator possessing configured for both an armature and a stator moving simultaneously in opposing directions, thereby multiplying the number of oscillations per unit of force exerted upon the generator.

\* \* \* \* \*